May 22, 1962     K. C. NICHOLSON ETAL     3,035,325

METHOD OF MAKING SILICON CARBIDE BODIES

Filed Feb. 21, 1958     3 Sheets-Sheet 1

INVENTOR.
K.C. NICHOLSON
S.D. MARK, JR.
BY
ATTORNEY

May 22, 1962 K. C. NICHOLSON ETAL 3,035,325
METHOD OF MAKING SILICON CARBIDE BODIES
Filed Feb. 21, 1958 3 Sheets-Sheet 2

INVENTOR.
K.C. NICHOLSON
S.D. MARK, JR.
BY
ATTORNEY

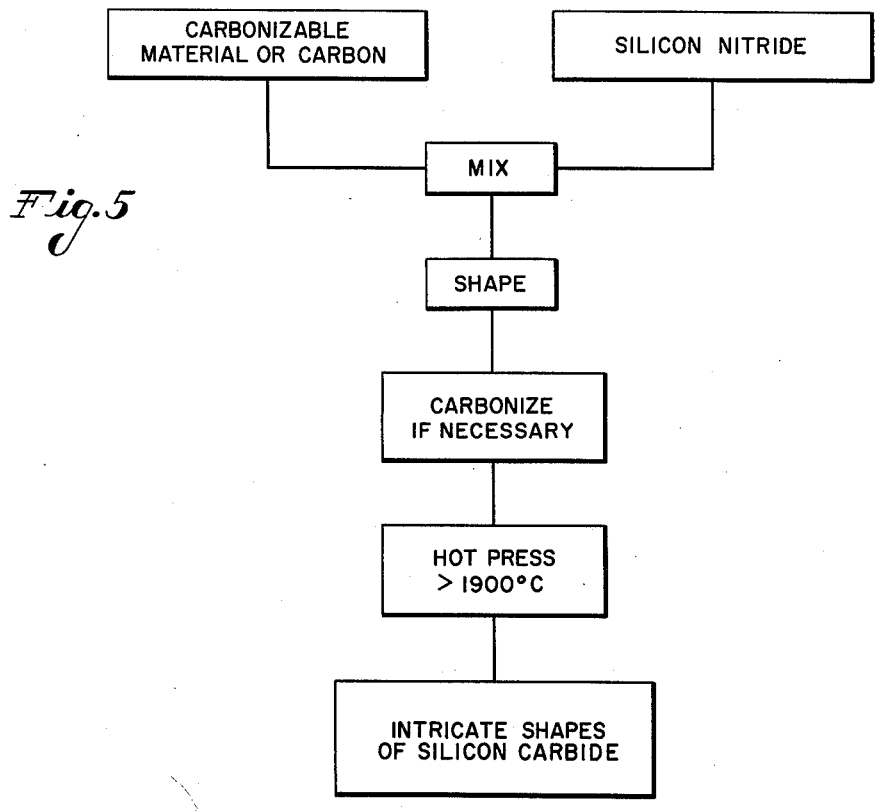

3,035,325
METHOD OF MAKING SILICON
CARBIDE BODIES
Kenneth C. Nicholson, Niagara Falls, and Stanley D. Mark, Jr., Grand Island, N.Y., assignors to The Carborundum Company, Niagara Falls, N.Y., a corporation of Delaware
Filed Feb. 21, 1958, Ser. No. 716,675
10 Claims. (Cl. 25—157)

This invention relates to a new process for impregnating formed bodies with metallic silicon, and also to processes for making bodies that contain silicon in metallic and in chemically combined form.

One method of impregnating an article with silicon comprises surrounding the article with fine particles of metallic silicon at a relatively low temperature, then heating the article and the silicon to a sufficiently high temperature to cause a rapid flow of molten metal through the pores of the article. This technique has been employed, for example, in the production of siliconized carbide articles.

For some purposes, this method of siliconizing has proved unsatisfactory, and no completely satisfactory alternative process has been available. For example, where large preformed shapes are immersed in molten silicon, there frequently is uneven distribution of heat in the preformed article, and distortion sometimes occurs. Moreover, erosion sometimes occurs, caused by flow of the molten silicon, and the process therefore is inefficient for siliconizing precise shapes. In addition, where it is desired to make a body that contains an exact amount of free silicon, very little degree of control can be applied.

When fine metallic silicon is employed to siliconize an article, an indeterminate amount of silicon is always lost, because silicon vaporizes at temperatures below siliconizing temperatures, so that some silicon is always vaporized and lost before siliconizing occurs. For example, in siliconizing a preformed shape of silicon carbide, using metallic silicon, the shape must be at a minimum temperature of about 1600° C. or it will not siliconize. The metallic silicon melts at about 1420° C. and is therefore molten before the shape reaches siliconizing temperature, and some silicon vaporizes and is lost.

One object of the present invention is to provide a process for siliconizing that prevents distortion of preformed shapes.

Another object of the invention is to provide a technique by which molten silicon is made available under such conditions, and at a sufficiently high temperature, so that it can immediately react in the manner desired.

Another object of the invention is to provide a process of siliconizing precise shapes that avoids any danger of erosion.

A related object of the invention is to provide an efficient process for the production of silicon carbide bodies in precise shapes.

A further object of the invention is to provide a siliconizing process in which the silicon content of the siliconized body can be closely controlled, and the amount of silicon required to be used in siliconizing can be predetermined accurately.

Still another object of the invention is to provide an inexpensive siliconizing process that is sufficiently economical for mass production.

A related object of the invention is to provide a process for producing siliconized silicon carbide bodies, and more particularly, to provide a process of this type that permits close control over the amount of free silicon in the body. Another related object of the invention is to provide a process for producing dense carbide bodies that contain silicon carbide and that may contain free silicon, and that have a controlled degree of porosity.

According to the invention, silicon nitride is employed as a source of silicon in siliconizing processes. Silicon nitride is a solid material that decomposes at temperatures in excess of about 1900° C., to release molten silicon and gaseous nitrogen. Silicon nitride is ideal for siliconizing since the silicon is released at a temperature where it will wet many bodies readily and flow easily, so that siliconizing takes place immediately. There is little or no waste.

When silicon nitride is used as a source of silicon for siliconizing a preformed shape of silicon carbide, for example, the silicon nitride is unchanged until a temperature of about 1900° C. is reached. The silicon nitride then decomposes into silicon and nitrogen, and molten silicon is supplied to the shape which is at a sufficiently high temperature to react immediately with the molten silicon.

In the presence of carbon, silicon nitride is decomposed at temperatures over 1600° C., particularly where the temperature is maintained at 1600° C. or higher for a period of time, to form silicon carbide. When the temperature is raised rapidly, however, to 1900° C. and higher, even in the presence of carbon, the silicon nitride is substantially unaffected until the decomposition temperature is attained, and then free silicon is released.

The advantageous properties of silicon nitride render it susceptible for use for supplying silicon for a variety of purposes. Many of these techniques are described in detail, for illustrative purposes, in the specific examples that follow, and are shown diagrammatically in the drawings.

Figure 4:
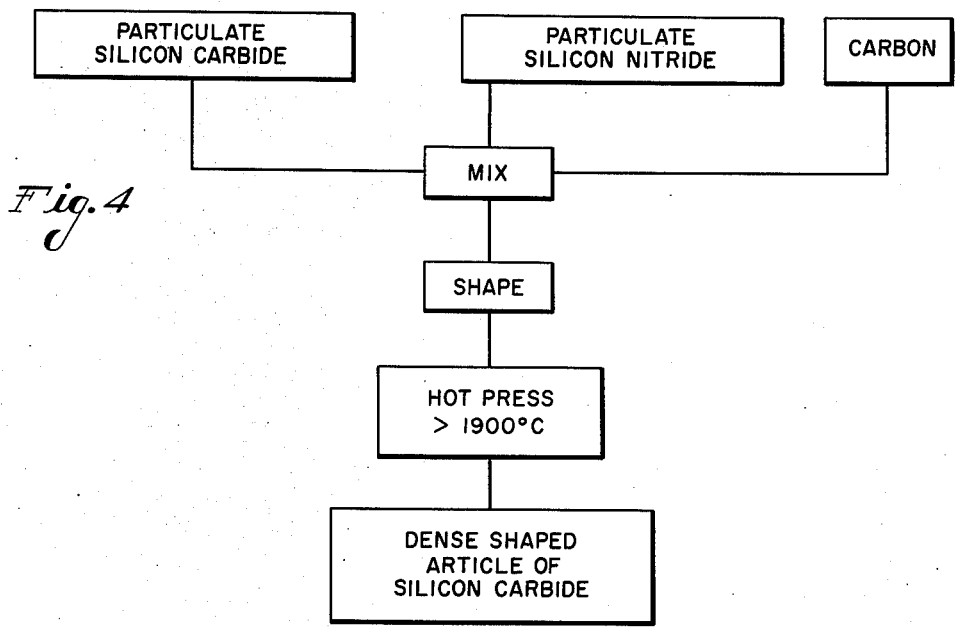

FIG. 4 is a diagrammatic representation of another embodiment of the invention in which a mixture of granular silicon carbide, silicon nitride, and carbon are hot pressed to form a dense silicon carbide body; and FIG. 5 is a diagrammatic representation of still another embodiment of the invention, wherein a specially prepared mixture of carbon and silicon nitride is formed into intricate shapes of silicon carbide.

Several techniques for using silicon nitride to supply silicon, conducted according to the present invention, will now be described in the specific examples that follow, with reference to the drawings.

EXAMPLE 1

*Siliconizing a Shaped Body*

Figure 1:
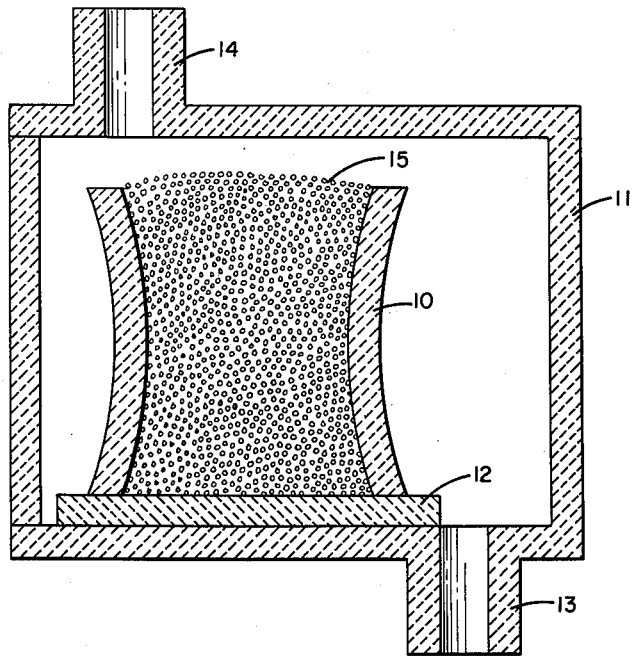
FIG. 1 is a schematic section of a chamber of a high frequency furnace, showing a rocket nozzle and granular silicon nitride disposed in the chamber, ready for firing to siliconize the nozzle, according to one embodiment of the invention.

Referring now to FIG. 1, a rocket nozzle shape 10 was formed by pressing granular silicon carbide with a small amount of temporary binder, in a steel mold, and drying at about 250° F. The shape 10 was then placed on a batt 12 of silicon carbide, in a graphite container 11 of a size suitable for placing in the chamber of a high temperature furnace. The container 11 was formed with a gas inlet 13 on its lower side, and with a sight tube and gas outlet 14 on its upper side. The bore of the shape 10 was filled with granular silicon nitride 15.

Figure 2:
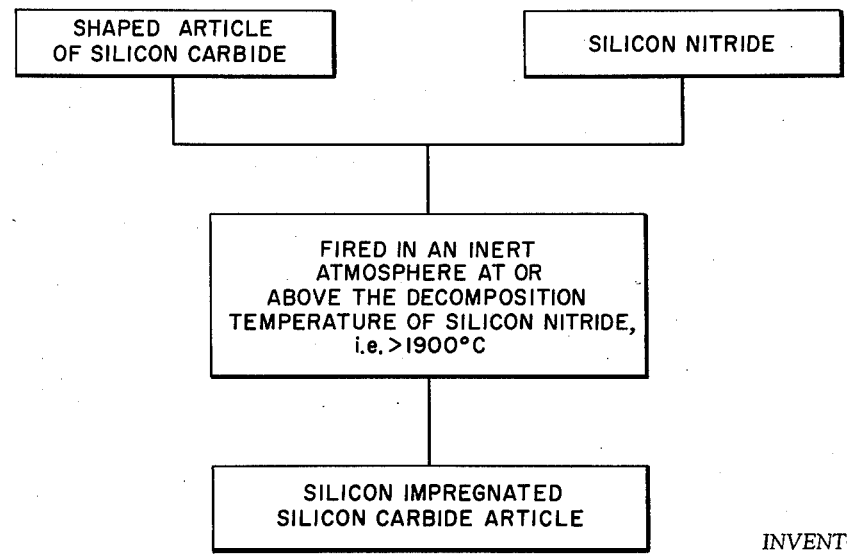
FIG. 2 is a diagrammatic representation of the steps involved in a siliconizing process according to one embodiment of the invention.

The siliconizing process then followed the steps generally indicated in FIG. 2. An atmosphere of helium gas was maintained inside the container 11 by continuously passing a stream of "welding grade helium" into the inlet 13. The contents of the chamber were brought up to a maximum temperature of about 1950° C. gradually, over a period of about 2½ hours.

The container 11 and its contents were held at a temperature in the range between 1900° C. and about 1950° C. for about 30 minutes, and then were permitted to cool. The nozzle was then removed and cut longitudinally with a diamond wheel. The interior of the nozzle was found to be very dense and fine grained in structure. Physical and chemical tests indicated that a very satisfactory impregnation with silicon had occurred.

While the exact mechanism of this method of impregnating bodies is not fully understood, one possible explanation can be made that is particularly applicable to the siliconizing of silicon carbide bodies. It is known that silicon metal will wet silicon carbide if the temperature is high enough. Silicon nitride remains essentially unchanged when heated rapidly in helium or other inert atmosphere, until the decomposition temperature of about 1900° C. is reached. At that temperature, the silicon nitride decomposes rapidly and suddenly into silicon and nitrogen. This temperature is sufficiently high so that the liberated silicon wets the silicon carbide article and is drawn into the pores of the article by capillary attraction, a phenomenon that is not completely understood but that is widely employed for siliconizing.

This siliconizing technique can be employed to impregnate substantially any porous refractory body with silicon, provided the body can be wet readily with molten silicon at temperatures above about 1900° C. up to the decomposition temperature of the refractory body. Preferably, siliconizing is carried out by heating the body rapidly to temperatures in the range between about 1900° C. and 2000° C. An inert atmosphere should be maintained during firing. The atmosphere may be helium, argon, and the like, and where adequate safety precautions are taken, hydrogen can be used. Nitrogen can also be employed to provide the inert atmosphere for siliconizing many bodies. Any environment can be maintained that will not affect the siliconizing, and the term "inert atmosphere" is used herein to denote such an environment. After siliconizing, the inert atmosphere should be maintained until the temperature is below about 800° C., as a precaution.

In some cases, it may be desired to maintain the silicon nitride in a particular shape until it is decomposed. In such cases, a temporary binder of sodium silicate or like material can be used. The siliconizing process is effectively accomplished whether the silicon nitride is in the form of loose granules or in a shape, and the steps generally indicated in FIG. 2 are followed in each case.

EXAMPLE 2

*Siliconizing a Shaped Body of Silicon Nitride-Bonded Silicon Carbide*

Further to demonstrate the invention, a nozzle, that was made from silicon nitride-bonded silicon carbide, was fired in the presence of silicon nitride. Following the procedure described immediately above, the nozzle and silicon nitride were held for about thirty minutes at a temperature in the range between about 1900° C. and 1950° C. The initial weight of the nozzle was 874 gr., and its weight after firing was 863 gr. The loss in weight occurred because the silicon nitride originally present in the nozzle was decomposed during the firing process. The nozzle was impregnated with silicon from its original content of silicon nitride and from the granular silicon nitride that was placed within the bore of the nozzle. A small residue remained in the container after firing, from the silicon nitride.

The nozzle color changed from a light gray or blue to a very dark gray, almost black, after siliconizing. The residue that remained from the silicon nitride was a black ash that contained a few metallic beads.

EXAMPLE 3

*Process of Making Siliconized Bodies by Hot Pressing*

Figure 3:
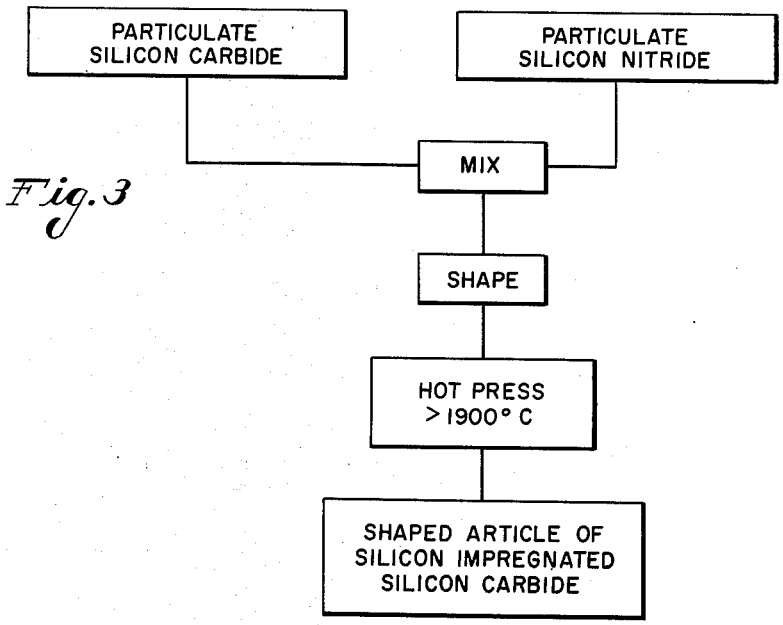
FIG. 3 is a diagrammatic representation of a siliconizing process according to another embodiment of the invention, in which granular silicon carbide and granular silicon nitride are fired to form siliconized silicon carbide bodies of controlled density.

This example describes a siliconizing process that is diagrammatically represented in FIG. 3.

Silicon carbide of graded particle size is tumbled with granular silicon nitride. After thorough mixing, the mixture is placed in a graphite mold in a hot pressing furnace, and is pressed in a helium atmosphere at a temperature in the range between about 1900° C. and 1950° C., at a pressure of about 2000 p.s.i., for about 30 minutes. The body is cooled in the helium atmosphere to below about 800° C.

A dense siliconized silicon carbide body is obtained in this manner. The elemental silicon that is liberated by the decomposition of the silicon nitride flows in and about the silicon carbide particles and covers them, and fills the pores between them.

Several other similar demonstrations of the invention can be made. In one such demonstration, the silicon carbide and silicon nitride may be in powder form. When the powdered mixture is hot pressed, a dense body of siliconized silicon carbide is obtained. In this demonstration of the invention, three mixtures are prepared by tumbling the dry ingredients, then, after thorough mixing, adding the liquid ingredients and continuing the tumbling. The three batches contain the following ingredients:

|  | Mixture 1, Weight in Grams | Mixture 2, Weight in Grams | Mixture 3, Weight in Grams |
| --- | --- | --- | --- |
| Silicon carbide, 1000 grit | 54 | 54 | 54 |
| Silicon nitride | 17 | 30 | 42 |
| Liquid phenol-formaldehyde resin | 1.5 | 1.58 | 1.92 |
| Pine oil | 6 cc. | 7 cc. | 8 cc. |

The mixtures are pressed to form shaped bars at 3000 p.s.i., then are dried at 200° C. for 2 hours. The shapes are then heated slowly to 1000° C., then the temperature is increased rapidly to 1900° C. and held there for about 5 minutes, to decompose the silicon nitride.

These bars have the following characteristics:

|  | Density, Grams/cc. | Percent Free Silicon |
| --- | --- | --- |
| Bar 1 | 1.49 | 5.64 |
| Bar 2 | 1.39 | 14.00 |
| Bar 3 | 1.38 | 17.60 |

An X-ray examination of the bars shows that they contained no detectable silicon nitride. This process therefore provides a way to produce silicon carbide bodies that have a controlled content of free silicon.

In another demonstration of the invention, the mixture of silicon carbide and silicon nitride was pre-sintered in a desired shape. The shape was then placed in a correspondingly shaped graphite mold and was pressed in a hot pressing furnace substantially in the manner described above. The shape remained dimensionally true after hot pressing, and a dense body of siliconized silicon carbide was obtained in this way, in the desired shape.

In forming siliconized silicon carbide according to this embodiment of the invention, substantially the same operating parameters apply as were described above, as to the use of an inert atmosphere, pressing temperatures, bodies that can be siliconized, and the like. Depending upon the density desired, the pressure can be about 1000 p.s.i. or greater, up to the limit of strength of the graphite mold. In general, pressures on the order of about 2000 p.s.i. to 10,000 p.s.i. are employed. The relative proportions of silicon carbide and silicon nitride will control the density (porosity) of the body, to a large extent. Since nitrogen escapes as a gas from the silicon nitride as it decomposes, a somewhat porous mass is left behind. To some extent, the application of high pressures during the hot pressing process will consolidate the mass and fill in the void spaces left by the evolution of the nitrogen.

The use of an inert atmosphere is not always essential in hot pressing processes, since there is little opportunity for contact with the atmosphere, and since the evolved nitrogen protects the silicon to a large extent.

EXAMPLE 4

Process of Making Bodies of Silicon Carbide

This example describes a process for making silicon carbide according to the siliconizing process that is diagrammatically represented in FIG. 4.

Finely divided silicon carbide, silicon nitride, and carbon were tumbled together. This mixture was then placed in a mold, heated rapidly, and hot pressed in an inert atmosphere, in the manner described in the preceding example. When temperatures above the dissociation temperature of silicon nitride were reached, metallic silicon was liberated that reacted with the carbon to form silicon carbide. Under the densifying action of the hot pressing furnace, the newly-formed silicon carbide was combined with the silicon carbide of the raw batch.

For best results, the silicon carbide employed is a mixture of graded particle sizes, to obtain optimum density in the bodies.

Other refractory carbides that do not decompose at temperatures around 1900° C., such as, for example, boron carbide, can be substituted for the silicon carbide. This process provides a simple way of preparing bodies of carbide mixtures, such as, for example, a body containing 85% silicon carbide and 15% boron carbide. To prepare such a body, the required amount of boron carbide is substituted for the finely divided silicon carbide, in the first step of the process; the remaining steps of the process are then carried out as described above. The term "refractory carbide" is employed herein to refer to those carbides that do not decompose at temperatures at which silicon nitride decomposes. Other refractory carbides that can be siliconized by the decomposition of silicon nitride, either alone or in admixture with silicon carbide, include the carbides of boron, titanium, zirconium, niobium, and tantalum, for example.

In other demonstrations of the invention, following generally the process described immediately above, presintered shapes of silicon nitride-bonded silicon carbide were employed as a starting material. These shapes were prepared by mixing and tumbling together graded silicon carbide particles and fine metallic silicon. When these dry materials were thoroughly mixed, a resinous temporary binder and a small amount of pine oil were added, and these materials were then mixed together. This raw batch was molded at 6000 p.s.i. to form several shapes. The shapes were dried in an oven for one day at a temperature in the range between about 125° C. and 150° C. The dried shapes were nitrided by holding them for about 6 hours at 1400° C. in a flowing nitrogen atmosphere. The bodies obtained were silicon nitride-bonded silicon carbide.

These bodies were porous. As the next step in the processing of these bodies, carbon was impregnated into the pores. Although many techniques are available for carbon impregnation, a preferred method was followed in which these bodies were immersed and soaked in a phenol-formaldehyde base resinous solution. The shapes were then fired to carbonize the resin and to deposit carbon in the pores of the body. These carbon-impregnated, silicon nitride-bonded, silicon carbide bodies were then hot pressed in an inert atmosphere, in the manner already described, and silicon carbide bodies were obtained.

Silicon carbide bodies that are produced in the manner described in this example ordinarily will contain little excess silicon, provided that proper proportion of carbon to silicon nitride are employed. This process has the advantage that there is no wraping or distortion when the bodies are hot pressed in a mold. The bodies that are obtained by hot pressing have a smooth surface and can be formed in practically any desired shape that can be molded, and close dimensional tolerances can be met. These bodies are particularly interesting as possible fuel element material for a nuclear reactor.

In a similar manner, substantially any refractory body, that has an intercommunicating network of pores, can be rendered less porous and more dense; either by siliconizing by heating in the presence of silicon nitride above the decomposition temperature of silicon nitride and in an inert atmosphere; or by loading the pores with carbon by any available technique, and then releasing free silicon to react with the carbon, according to this invention. Among the known ways of depositing carbon in the pores, there can be mentioned the resin impregnation and carbonizing process described above; pyrolysis of methane and other hydrocarbons; and impregnation of the shape with furfural or the like, followed by carbonization by acidification.

This process for supplying silicon can also be employed in forming dense silicon carbide bodies according to the processes described in the pending patent applications of Taylor, Serial No. 502,741, filed April 20, 1955; and James C. Andersen, Serial No. 678,017, filed August 13, 1957. These applications relate generally to processes for producing dense bodies of silicon carbide by reacting silicon with the carbon in carbon-containing bodies of silicon carbide. As pointed out particularly by Andersen, dense bodies may be obtained by reacting silicon with the free carbon in a shape that has an intercommunicating network of pores and that consists essentially of silicon carbide, with carbon deposited in the pores, the carbon being present in the amount between about 85% and 95% of the stoichiometric amount that is required to react with silicon to form sufficient silicon carbide to form a completely solid body of silicon carbide. Silicon nitride can be used successfully and advantageously as the source of silicon in the Taylor and Andersen processes.

EXAMPLE 5

Hot Pressed Silicon Carbide Bodies From Mixtures of Carbon and Silicon Nitride This example describes an embodiment of the invention that is diagrammatically represented in FIG. 5.

A solution of furfural and furfuryl alcohol was prepared, and finely divided silicon nitride was stirred into the solution until a substantially homogeneous dispersion was obtained. Thereafter, a mineral acid, such as commercial hydrochloric acid, was added to the mixture, and the acidified dispersion was poured into a mold. The reaction between the furfural-furfuryl alcohol solution and the hydrochloric acid was completed after several hours. The wet carbon body was then removed from the mold and was calcined in a neutral atmosphere at about 1200° F. This temperature was maintained for a sufficiently long time to drive off all moisture and other volatile matter.

The shaped body thus obtained consisted of carbon with silicon nitride substantially uniformly dispersed therein. Substantially a stoichiometric amount of silicon nitride, for complete siliconization of the carbon to form silicon carbide, was employed. This body was placed in a graphite mold and heated rapidly to a temperature above 1900° C., to cause the silicon nitride to decompose to release silicon and gaseous nitrogen. The silicon reacted with the carbon and formed a silicon carbide body.

This process is particularly useful for making shapes to close dimensional tolerances, and the shapes may be intricate because the mold will prevent distortion.

Many other suitable carbonizable mixtures that can be mixed with silicon nitride, according to this embodiment of the invention, are described in U.S. Patent 2,431,326, granted November 25, 1947, and particularly in Examples 7, 8 and 9 of that patent. Other carbonizable substances may be substituted for the furfural solution in furfuryl alcohol, such as, for example, glycerine. In addition, small amounts of graphite may be incorporated in the mix, and furfural or furfuryl alcohol may be employed alone. Other mineral acids, such as, for example, sulphuric acid, may also be used.

Mixtures of graphite or finely divided carbon, synthetic resin, and silicon nitride can be employed in a similar manner to form silicon carbide bodies that may have intricate shapes and close dimensional tolerances. The more readily carbonizable synthetic resins are preferred, such as, for example, the condensation products of formaldehyde with a phenol, such as phenol or resorcinol.

EXAMPLE 6

Mass Production Techniques

To demonstrate the adaptability of the processes of this invention to mass production, several bricks consisting essentially of silicon carbide and a small amount of finely divided carbon were placed in a special silicon carbide furnace, and several other bricks consisting essentially of silicon nitride were placed on top of the silicon carbide-carbon bricks. All of the bricks were covered with an electrically conductive mix, and the furnace was operated to raise the temperature of the bricks above 1900° C. It will be recognized that the process steps involved are those generally indicated in FIG. 2.

This proved to be an efficient process for siliconizing the silicon carbide bricks, since substantially all of the carbon in the bricks converted to silicon carbide, so that dense, refractory bricks were obtained.

The bricks of silicon carbide and graphite were prepared substantially in the manner described in the copending Taylor patent application, Serial No. 502,741. Following the processes generally described in that patent application, a mixture was made of the following ingredients:

| | Percent |
|---|---|
| Silicon carbide, 14 mesh and finer | 86.0 |
| Fine carbon (through a 15 X Silk Screen) | 5.0 |
| Liquid phenolic resin | 9.0 |

The graded silicon carbide was tumbled for 30 minutes to insure uniformity, and thereafter the graphite was added and the dry ingredients were then tumbled for an additional period of 30 minutes. The mixture was then wet with the liquid phenolic resin, and the entire mixture was then passed through a coarse screen to break up any aggregates. The wet mix was shaped into bricks that had the dimensions 2½″ x 4½″ x 9″ and that had a wet density of 2.7 g./cc. These bricks were formed at 6000 p.s.i. and were oven-dried for one day at 170° F. and for one day at 260° F. The average density of the dry bricks was 2.64 g./cc.

The bricks of silicon nitride were prepared by mixing 100 parts by weight of fine silicon metal, that had a particle size of about 75 microns and lower, with 2 parts by weight of a phenolic temporary binder. Sufficient pine oil was added to moisten the entire mass. After a homogeneous mix had been obtained, bricks were pressed from the mix at 3000 p.s.i., to the same upper and lower surface area as the silicon carbide-carbon bricks, but with less thickness. The silicon nitride bricks were not as thick because only the stoichiometric amount of silicon nitride was used to provide enough silicon to impregnate the silicon carbide bricks. These silicon bricks were then oven-dried at 150° F. for several hours, then at 160° C. for about 16 hours. The bricks were then nitrided by heating them in an atmosphere of nitrogen at 1350° C. for 5 hours, then at 1400° C. for an additional period of 5 hours.

The technique of using silicon nitride as a source of silicon for siliconizing processes is very effective in producing silicon carbide bodies. A primary advantage is that the silicon can be placed where it is wanted and in the quantity in which it is wanted, even under mass production conditions. In addition, as pointed out in the various examples, intricate and precise shapes can be made that will conform to close dimensional tolerances. The use of an electric furnace as the source of heat offers many economies and makes this technique attractive for mass production.

The foregoing examples demonstrate several applications of the invention, in its several embodiments, but it should be understood that these demonstrations of the invention are illustrative and not limiting. For example, while temperatures on the order of about 1900° C. to 2000° C. are preferred for siliconizing with silicon nitride, higher temperatures can be employed, for example, where it is desired after siliconizing to convert silicon carbide in the siliconized body from its cubic crystal form to the hexagonal form. Also, while it is preferred that there be direct contact between the silicon nitride and the refractory body during siliconizing, it is not essential. A porous wick can be interposed between the two, where desired, and the silicon nitride and the refractory body may be physically separated, so that siliconization is accomplished completely by silicon vapors. Many other modifications of the specific compositions suggested, and many variations of the operating procedures and conditions, will occur to those skilled in the art when this disclosure has been made known.

There is a continuing demand and search for new refractory bodies that possess certain characteristics for specialized purposes. The processes of this invention can be employed for the production of refractory bodies of types already known, as well as for the production of new types of refractory bodies. For example, the processes described above are advantageous for the mass production of silicon carbide heating elements and siliconized silicon carbide heating elements; long slender tube forms of silicon carbide; cutting tools; high temperature linings and nozzles for ram-jet and rocket motors; crucibles, rods, muffles, plates, and dishes; and refractory kiln furniture of all types.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

We claim:

1. A process of impregnating a porous refractory article with silicon which comprises heating said article in an inert atmosphere in the presence of silicon nitride, at least to the decomposition temperature of silicon nitride, to decompose the silicon nitride and release free silicon at said decomposition temperature, and to cause said free silicon to impregnate said article.

2. A process according to claim 1 wherein the refractory article consists essentially of silicon carbide.

3. A process according to claim 1 wherein the article to be treated contains a source of free carbon which reacts with the silicon derived from the silicon nitride when decomposed, to form silicon carbide.

4. A process according to claim 1 wherein the silicon nitride to be decomposed is contained within the article to be impregnated.

5. A process according to claim 1 wherein the silicon nitride to be decomposed is in the presence of but external to the article being impregnated.

6. A process of making dense refractory carbide articles of manufacture which comprises forming a shape comprising a homogeneous mixture of a refractory carbide and a source of carbon, and heating said shape in the presence of silicon nitride to a temperature sufficient to effect decomposition of the silicon nitride to release free silicon into said shape and cause said free silicon to react with the carbon to form silicon carbide.

7. The process of claim 6 wherein the refractory carbide is silicon carbide.

8. A process of making shaped silicon carbide articles of manufacture which comprises providing a mixture of a carbonizable material and silicon nitride, forming said mixture into a shaped article, heating the article to a temperature sufficient to carbonize said carbonizable material and form free carbon in the body of said article, further heating said article to decompose the silicon nitride into free silicon, and cause said free silicon to react with the free carbon to form silicon carbide.

9. A process according to claim 8 in which the mixture from which the article is molded also contains a refractory carbide.

10. A process according to claim 9 in which the refractory carbide is silicon carbide.

References Cited in the file of this patent

UNITED STATES PATENTS

| | | | |
|---|---|---|---|
| 2,091,569 | Ridgway | Aug. 31, | 1937 |
| 2,431,326 | Heyroth | Nov. 25, | 1947 |
| 2,803,314 | Taylor | Oct. 1, | 1957 |

FOREIGN PATENTS

| | | | |
|---|---|---|---|
| 3,082 | Great Britain | Oct. 25, | 1890 |
| 513,265 | Great Britain | Oct. 9, | 1939 |